United States Patent
Cohen et al.

(10) Patent No.: US 7,095,782 B1
(45) Date of Patent: Aug. 22, 2006

(54) METHOD AND APPARATUS FOR STREAMING SCALABLE VIDEO

(75) Inventors: Robert A. Cohen, Chappaqua, NY (US); Hayder Radha, Mahwah, NJ (US); Kavitha Parthasarathy, Campbell, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/516,035

(22) Filed: Mar. 1, 2000

(51) Int. Cl.
*H04N 7/12* (2006.01)

(52) U.S. Cl. .............. 375/240.01; 370/455; 348/410.1

(58) Field of Classification Search ........... 375/240.01, 375/240.05, 240.11, 240.12, 240.15, 240.22; 348/385.1, 405.1, 390.1, 404.1, 410.1, 412.1; 340/825.5; 370/455, 440, 468
See application file for complete search history.

(56) References Cited

U.S. PATENT DOCUMENTS

| | | | |
|---|---|---|---|
| 5,740,176 A | * | 4/1998 | Gupta et al. ............. 370/440 |
| 5,742,892 A | * | 4/1998 | Chaddha ................ 375/240.22 |
| 6,075,768 A | * | 6/2000 | Mishra ..................... 370/229 |
| 6,269,078 B1 | * | 7/2001 | Lakshman et al. .......... 370/230 |
| 6,275,531 B1 | * | 8/2001 | Li .......................... 375/240.12 |
| 6,292,512 B1 | * | 9/2001 | Radha et al. ............ 375/240.1 |

FOREIGN PATENT DOCUMENTS

| WO | WO0002392 | 6/1999 |
|---|---|---|

OTHER PUBLICATIONS

Robert Cohen, Hayder Radha, "Streaming Fine–Granular Scalable Video over Packet–Based Networks", vol. 1, Nov. 2000. (Abstract).
Hayder Radha et al, "Scalable Internet Video Using MPEG–4", vol. 15, No. 1–2, Sep. 1999, pp. 05–126, (Abstract).

* cited by examiner

*Primary Examiner*—Gims Philippe
(74) *Attorney, Agent, or Firm*—Larry Liberchuk

(57) ABSTRACT

A system and method are disclosed for streaming scalable video data over a variable-bandwidth network such as a packet-based one. In other words, the number of bits (for FGS) or sub-layers (for discrete multi-layer scalability) is chosen to be transmitted for each enhancement layer frame. Further, these bits or sub-layers are also partitioned over multiple packets if being sent over a packet-based network. Further, a windowing function is used to smooth the variation in the number of bits or sub-layers transmitted for each frame in situations where the network bandwidth is varying.

22 Claims, 4 Drawing Sheets

METHOD AND APPARATUS FOR STREAMING SCALABLE VIDEO

BACKGROUND OF THE INVENTION

The present invention relates generally to video data transmission, and more particularly to a method and apparatus for streaming scalable video over networks having a variable bandwidth.

Scalable video coding refers to coding techniques that are capable of providing different levels or amounts, of data per frame of video. Currently, such techniques are used by such video coding standards as MPEG-2 and MPEG-4 (i.e. "Motion Picture Expert Groups" coding). In the scalable coding techniques employed by these standards, frames of video data are encoded and divided into a base layer and an enhancement layer.

Typically, the base layer includes a minimum amount of data required to decode the coded video data. The enhancement layer, on the other hand, includes additional data that enhances (i.e. improves the quality of) the base layer when decoded. During operation, all frames of the base layer are transmitted to a receiving device. However, the enhancement layer frames are only transmitted if the receiving device has sufficient processing power to handle the additional frames and/or the medium over which the frames are transmitted has a sufficient bandwidth.

One known scalable video technique is fine-granular scalability. Fine-granular scalability (FGS) codes the same image (e.g., a frame of video) using progressively more data each time coding takes place. For example, in a co-pending application entitled "Scalable Video Coding System," Ser. No. 09/110,616, to the same assignee as herein, a system is disclosed for video coding that has the property of fine-granular scalability, in which a base-layer of video is coded at a fixed rate, and a residual or enhancement-layer is coded to cover a wide range of rates.

Presently, the ISO MPEG-4 committee is researching methods for fine-granular coding. Thus, a need exists to come up with a practical method for streaming the enhancement layer. In another co-pending application entitled "System for Controlling Data Output to a Network", Ser. No. 09/177,962, also to the same assignee as herein, a method for streaming data over a packet-based network was disclosed. However, this method was only used in order stream base-layer video over the Internet.

SUMMARY OF THE INVENTION

The present invention is directed to streaming scalable frame-based data over a variable-bandwidth network such as a packet-based one. In other words, the number of bits (for FGS) or sub-layers (for discrete multi-layer scalability) is chosen to be transmitted for each enhancement layer frame. Further, these bits or sub-layers are also partitioned over multiple packets if being sent over a packet-based network. Further, a windowing function is used to smooth the variation in the number of bits or sub-layers transmitted for each frame in situations where the network bandwidth is varying.

In particular, the present invention is directed to a method for streaming scalable video including base layer data and enhancement layer data. The method includes transmitting the base layer data for a given interval. Determining if a loss of bandwidth has occurred in the given interval. Selecting a predetermined number of frames to distribute the loss of bandwidth over. Calculating a reduced amount of enhancement layer data to transmit in the predetermined number of frames. Transmitting the reduced amount of enhancement layer data in the given interval.

The method according to the present invention also can include determining if the predetermined number of frames has expired. Determining if any left-over enhancement layer data exists. Selecting a second predetermined number of frames to distribute the left-over enhancement layer data over. Calculating a second reduced amount of enhancement layer data to transmit in the second predetermined number of frames. Transmitting the second reduced amount of enhancement layer data in a second given interval.

BRIEF DESCRIPTION OF THE DRAWINGS

Referring now to the drawings where like reference numbers represent corresponding parts throughout.

DETAILED DESCRIPTION

The present invention is directed to transmitting scalable frame-based data over a variable-bandwidth network such as a packet-based one. Before being transmitted, the video data first must be compressed and coded into base-layer and enhancement-layer frames. For this, any of the known coding schemes can be used. For example, the base layer can be coded according to such known standards as JPEG, MPEG-1, MPEG-2, MPEG-4, etc. Further, the enhancement layer can be coded with any of the known scalability structures. However, for the following discussion, it is assumed that the "fine-granular scalability" structure is being used.

After the video data is encoded, the base-layer frames have an average bandwidth of $R_b$ bits/sec, and the enhancement-layer frames are coded at an average rate of $R_e$ bits/sec. In the overall system, all base-layer bits for a given frame must be transmitted so that the frame can be reconstructed at the decoder. The enhancement-layer frames have the characteristic of "fine granularity," meaning that any portion or all of the data for each frame may be transmitted. The quality of a decoded frame increases as more enhancement-layer bits are transmitted. It is assumed that the average total network bandwidth exceeds the base-layer bandwidth ($R_{tot} > R_b$) so that there is room to transmit the enhancement layer.

Given an average total network bandwidth ($R_{tot} > R_b$), and given a system clock operating with period T, $R_{tot}*T$ bits may be transmitted every clock period. In a noiseless theoretical system, there is enough room to transmit ($R_{tot} - R_b$)*T enhancement-layer bits during each clock period. In practice, however, the bandwidth available to transmit the enhancement-layer data is not constant due to network loss, noise, and bandwidth variations.

Further, the system clock operates with a period of T seconds, so in the description that follows, an interval counter i will be used such that time t=i*T. Thus, the average number of base-layer bits transmitted during each interval is $R_b*T$. The enhancement-layer was coded at rate $R_e$ bits/sec. Thus, the initial rate available to transmit the enhancement layer is $R_{tot}-R_b$ bits/sec, which may be less than $R_e$ since the enhancement-layer has the attribute of fine granularity. Given a frame-rate of v frames/second, it can be planned on ideally transmitting F bits from each enhancement-layer frame, where:

$$F = \begin{cases} (R_{tot} - R_b)/v & \text{bits if } R_{tot} - R_b \le R_e \\ R_e/v & \text{bits if } R_{tot} - R_b > R_e. \end{cases} \quad (1)$$

In practice, the bandwidth available for the enhancement layer is not constant. During an interval, after transmitting $R_b*T$ bits, there is only enough space for sending $(R_{tot}-R_b)*T-s_i$ bits, where $s_i$ is the number of bits that were used for other purposes or made unavailable during that time interval. For example, if after transmitting base-layer bits, the system needs to re-transmit older base-layer bits, this retransmission will use up some (or all) of the bit allocation for the given interval.

If $s_i=0$ for all i, F bits can be transmitted from each enhancement frame, so nothing special needs to be done. If $s_i>0$, we have a problem that is illustrated in FIG. 1.

Figure 1:
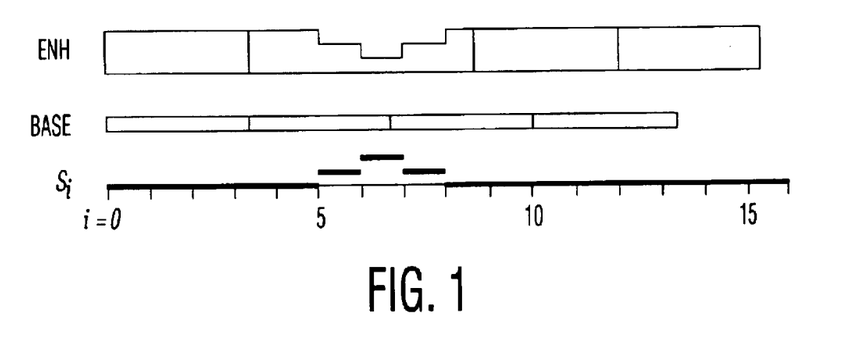
FIG. 1 is a timing diagram showing delayed enhancement layer transmission due to unavailable bandwidth.

As can be seen from FIG. 1, between time intervals 5–8, some bandwidth is not available for transmission of the entire enhancement layer. If it is ensured that all F bits of the corresponding enhancement-layer frame are transmitted, the next frame is delayed from being transmitted. Every interval in which $s_i>0$ causes the delay to accumulate. Given that an infinite buffer at the decoder is undesirable, the base layer and enhancement layer frames eventually will be so far out of synchronization that the system will either fail or completely ignore the delayed enhancement layer data.

Figure 2:
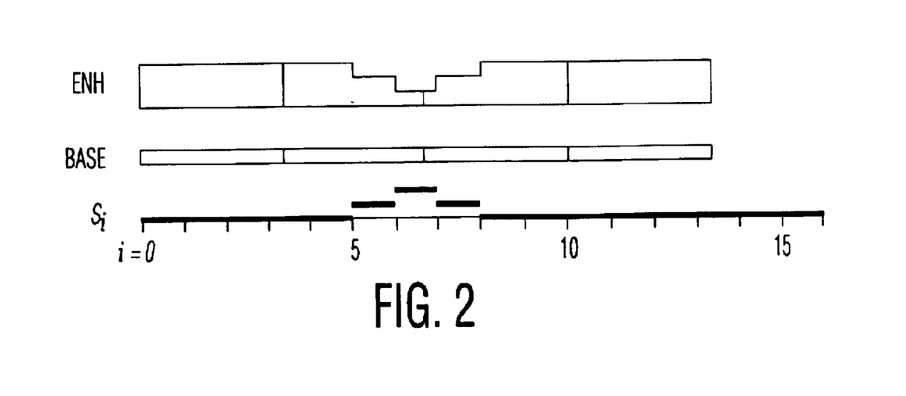
FIG. 2 is a timing diagram showing a wide variation in enhancement layer quality due to unavailable bandwidth.

In order to prevent this accumulation of delay, $s_i$ bits could be simply dropped from the frame being transmitted during interval i, as shown in FIG. 2. However, as can be seen, from FIG. 2, the problem with this method is that the number of bits dropped from successive enhancement-layer frames could vary widely and quickly. This could cause the decoded sequence to flicker unacceptably, or the viewer will see rapid and distracting changes in video quality.

In view of the above-described two problems, the method used to transmit the enhancement layer must satisfy two requirements:

Bits must be dropped from the enhancement layer to prevent the unbounded accumulation of delay; and The bits that are dropped must be distributed over several frames to prevent rapid variations in video quality.

In order to accomplish the above requirements, B(t) bits can be distributed over the next W(t) frames using a windowing function f(B(t), W(t), t). As later described, the removal of B bits can be distributed evenly over the next W frames, where:

$$f(B, W, t) = B/W. \quad (2)$$

Figure 3:
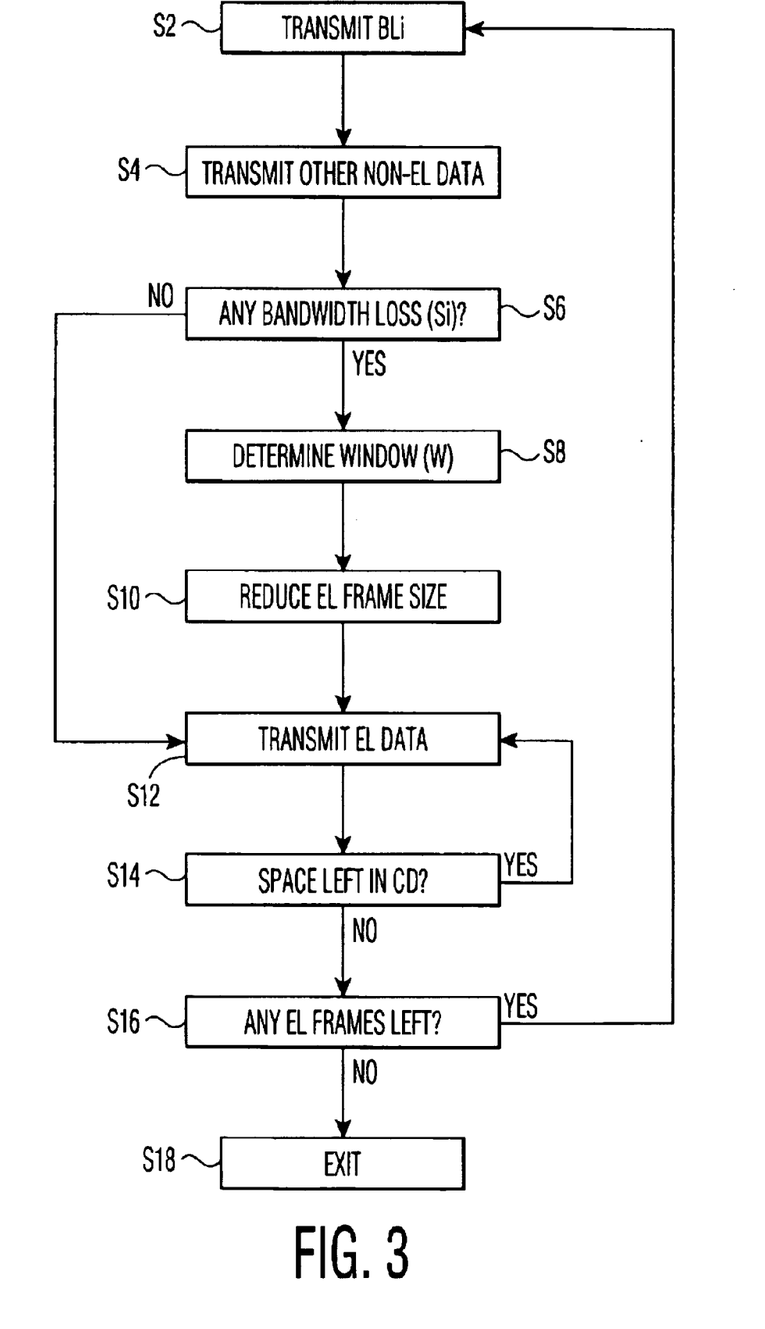
FIG. 3 is a flow diagram of the method according the present invention.

A method for streaming scalable video according to the present invention is shown in FIG. 3. In this method, the number of bits (for FGS) or sub-layers (for discrete multi-layer scalability) are chosen to be transmitted for each enhancement layer frame. Further, a windowing function is used to smooth the variation in the number of bits or sub-layers transmitted for each frame.

In step S2, the base layer data ($BL_i$) for the current time interval (i) is transmitted. As previously described, a system clock operates with a period of T seconds and an interval counter i will be used such that time t=i*T. Further, it should be noted that the time interval $t_i$ could be less than the time period of one video frame. In this case, a frame would be transmitted in a number of intervals (i, i+1, i+2, etc.)

In step S4, other non-Enhancement Layer (EL) data is also transmitted. The other non-EL data can be, for example, re-transmitted base-layer data from a previous interval, as previously described.

In step S6, it is determined if there is any loss ($s_i$) of bandwidth for the current interval (i). The loss ($s_i$) could be caused by the transmission of other non-EL data in step S4. If there was no non-EL data to transmit, the loss could also be due to a loss in network bandwidth. This loss in bandwidth can be due to packet loss, noise, and bandwidth variations. Further, the loss ($s_i$) also could have been caused by the combination of the above-described situations.

As previously described, this loss in bandwidth ($s_i$) is undesirable since it can reduce the initial rate available ($R_{tot}-R_b$ bits/s) to transmit the enhancement layer data for the current interval (i). If there is no loss ($s_i$), the method will advance and transmit the EL data for that interval in step S12. On the other hand, if there is loss ($s_i$) in step S6, the method will then go to step S8.

In step S8, a window (W) will be determined, which represents the number of frames that that the loss ($s_i$) will be distributed over. The window (W) can be a predetermined number that is selected based on such considerations as frame rate, image quality etc.

In step S10, the EL frame size is reduced for the number of frames specified by the window (W). The reduction of the EL frame size S10 will be performed according to a windowing function f(B(t), W(t), t). For example, in equation 2, the windowing function is B/W, where B=$s_i$ for this example. Thus, if $s_i$=50 bits and W=10 frames, the EL frame size would have to be reduced by 5 bits for the window (W) of ten frames.

It should be noted that equation (2) is only one example of a windowing function according to the present invention. According to the present invention, other windowing functions are contemplated such as a step function, exponential function and functions that depend on the base layer or enhancement layer frame type, e.g. I, P or B frame.

In step S12, the EL data for the current interval (i) is transmitted. It there was no loss ($s_i$) in step S6 and if the current frame is not in a window (W) due to earlier losses, the full amount of EL data for the interval (i) will be transmitted. If there was loss ($s_i$), then the amount of EL data transmitted for the interval (i) in step S12 will be reduced according to step S10.

In step S14, it is determined if any space is left in the current interval (i) to transmit additional data. If there is, the method will loop back to step S12 and transmit EL data for the next frame. Thus, the method will stay in this loop until the current interval (i) has no more space left to transmit data. When there is no space left, the method will then advance to step S16.

In step S16, it is determined if any EL data frames are left. If there are none left, this means the video sequence has expired and the method will exit in step S18. If there are EL frames left, the method will loop back to step S2 and transmit the data for the next interval. The method will stay in this loop until the video sequence has expired. It should be noted that in subsequent intervals, if there is no further lose of bandwidth ($s_i$) in the window (W), the amount of data transmitted in step S12 will be according to the initial reduction of frame size in step S10.

However, if there is further bandwidth lose ($s_i$) in subsequent intervals, the window will be determined again in step S8 and the EL frame size will again be reduced in step S10. In regard to the previous example of Equation (2), if there is further loss ($s_i$) in a second interval (i+1) of 35 bits. The window (W) would again be set to 10 and B=45+$s_i$. Therefore, the initial EL frame size would have to be reduced by 80/10=8 in step S10 for that subsequent interval.

Figure 4:
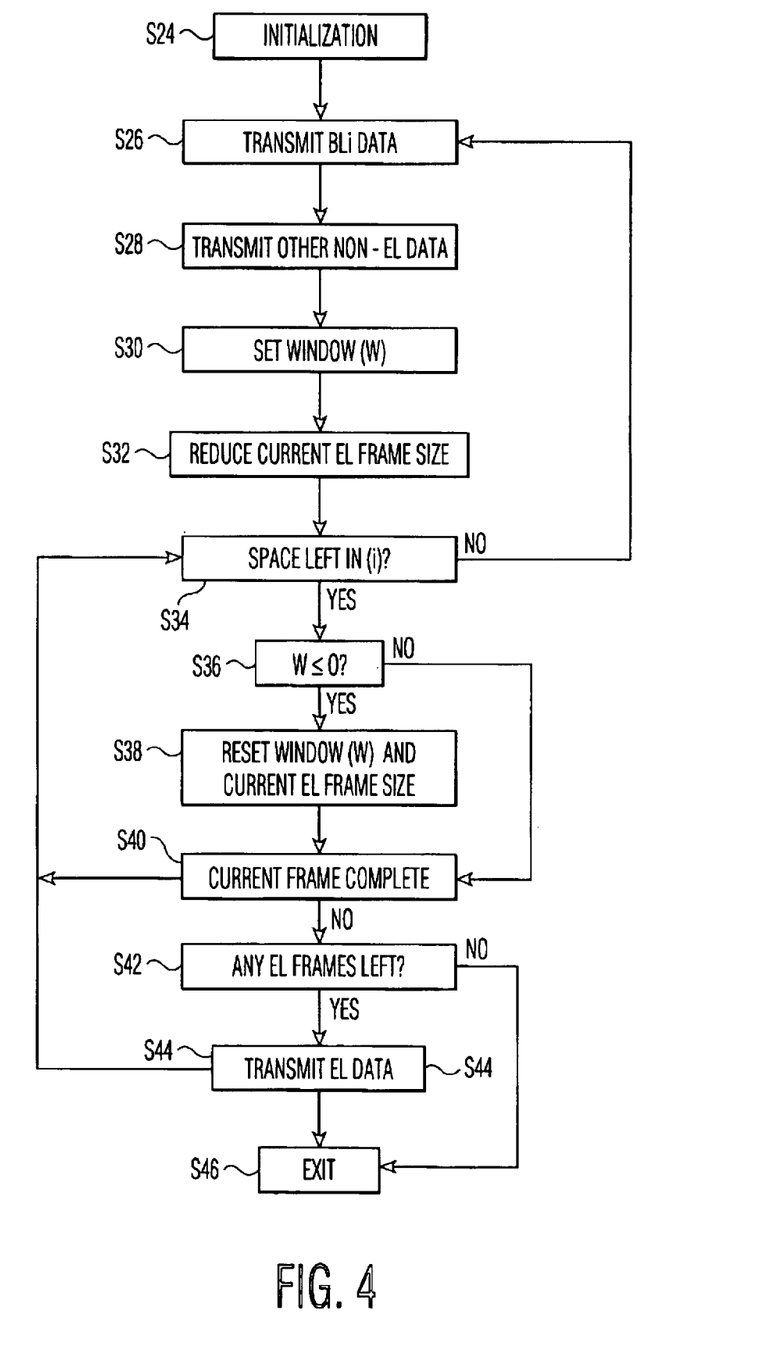
FIG. 4 is a flow diagram showing one embodiment of a detailed implementation of the method according to the present invention.

One embodiment of a more detailed implementation for the method of streaming scalable video according to the present invention is shown in FIG. 4. In describing the embodiment of FIG. 4, it is being assumed that the "FGS scalability" structure is used. However, it is well within the skill in the art to implement this embodiment using other scalability structures. Further, in this embodiment, it also being assumed that the data will be transmitted over a packet network such as the internet. Therefore, this embodiment also partitions the data being transmitted over multiple packets.

The following is a definition of parameters that are used in the following description of this embodiment:

| | |
|---|---|
| i | Iteration index for each time interval of T seconds. |
| $s_i$ | Number of bits that were made unavailable for EL transmission during interval i. |
| B | Total number of bits that still must be dropped from the EL. |
| buf_cur | Bit offset into the EL frame that will be transmitted next. |
| buf_end | Bit offset indicating the virtual end of the current EL frame. |
| M | Total number of EL frames in the sequence (may be ignored if we have a live or infinite sequence). |
| m | Pointer to an EL frame, where m = {0, 1, . . . M-1). |
| W | Number of frames (Window) over which B bits will be dropped, where $0 < W < W_{max}$. |
| $R_{tot}$ | Average bandwidth (bits/sec) of the entire data stream or available network. |
| $R_b$ | Average bandwidth (bits/sec) of the base-layer stream. |
| A | Number of bits of EL data that we have room to transmit during the current interval. |
| E | Cumulative total number of bits (all bits, not necessarily EL bits) that have been transmitted in the bandwidth allocated for the EL. |
| P | Maximum packet size (bits) for the network. |
| drop_rest | Flag that is set when the remaining bits of the current EL frame will not be sent. |

Still Referring to FIG. 4, in step S24, the above parameters are initialized. The following is one example of how these parameters could be initialized:
Set F as described in Equation (1).
M=total number of EL frames for this sequence if the video is not live.
P=max packet size
m=0 (point to first EL frame)
i=1 (first iteration)
B=0 (no bits to drop yet)
Buf_cur=0 (point to start of current frame)
Buf_end=F−1
$W_{max}$=10 (or some other value depending on frame rate, image quality, etc.)
E=0
drop_rest=FALSE
W=0

In step S26, the base layer data ($BL_i$) for the current interval (i) is transmitted. As previously described, a system clock operates with a period of T seconds and an interval counter i will be used such that time t=i*T. Further, in step S28, other non-Enhancement layer (EL) data is also transmitted. As previously described, this transmission could cause the loss ($s_i$). Further, during this step the parameters B and E are also set as follows:
B=B+$s_i$, (which represents the total number of bits that are needed to drop from the EL);
E=E+$s_i$, (which accounts for the $s_i$ bits that were transmitted in the space allocated for the EL).

In step S30, the window (W) is set, which represents the number of frames that that the loss ($s_i$) is distributed over. In this step, if ($s_i$>0) or (B>0 and W≦0), then W=min($W_{max}$, M-m).

In step S32, the current EL frame size is reduced. This is accomplished by calculating a new value for the "but_end" parameter. Since the parameter "but_end" is a pointer that points to the virtual end of an EL frame, reducing its value will reduce the size of the current EL frame. The new value for "buf_end" will be calculated according to the following windowing function:

$$\text{If } (W > 0), \text{ the buf\_end} = \min\left[F - 1 - \left(\frac{B}{W}\right), -1\right] \quad (3)$$

In step S34, it is determined if there is any space left in the current interval (i) to transmit data by calculating the total (cumulative) number of EL bits (from one or more frames) that should be transmitted by the end of this interval. In this step, the parameter "A" will be calculated as follows:

$$A=[i*(R_{tot}-R_b)*T]-E \quad (4)$$

If (A≦0), this means that there is no space in the current interval to transmit the EL data. Thus, the current interval will be incremented to i=i+1 and the method will loop back to step S26 to transmit the BL data for the next interval. If (A>0), then there is space in the current interval and the method will advance to step S36.

In step 36, it is determined if the window (W)≦0. Initially, this would not be true since none of the EL data has been transmitted yet. Thus, if (W)≦0, the method advances to step S38. On the other hand, if (W) is not ≦0, the method advances to step S40.

In step S40, it is determined if the current frame of EL data has been completely transmitted. This step can be accomplished by seeing if (buf_cur>buf_end). Since buf_cur is a pointer that points to the beginning portion of the current EL frame to be transmitted and buf_end points to the virtual end of the current EL frame, buf_cur>buf_end indicates that no more data from the current frame will be transmitted.

If (buf_cur>buf_end), then m=m+1 (advance to the next enhancement frame) and drop_rest=FALSE. Further, the method then loops back to step S34. However, it should be noted that initially the condition of (buf_cur>but_end) would not be true since none of the frames of EL data have been transmitted yet. If this condition is not true, the method then advances to step S42.

In step S42, it is determined if any frames of EL data are left to be transmitted. If there are no frames left, this means the video sequence has expired. Thus, if (m==M), then there are no more EL frames left and the method exits in step S46. If this condition is false, the method then advances to step S44.

In step S44, the EL data is transmitted. In this step, either some or all of the EL bits for a current frame is transmitted. According to this embodiment, step S44 is performed in three sub-steps.

In the first sub-step, the number of bits to be transmitted (nbits_to_send) from the current EL frame must be determined as follows:

(nbits_to_send=buf_end−buf_cur+1)

In the second sub-step, it is determined if the current interval (i) has enough space to transmit all the bits as follows:

If (nbits_to_send<A) then:
  nbits_sent=min(P, nbits_to_send), (divides the bits into packets).
  Transmit nbits_sent bits beginning at buf_cur bits into EL frame m.
  If(nbits_sent==nbits_to_send) then: (Done transmitting current frame)
    B=B−(F−buf_end−1), (Reduce B by the number of bits that was dropped from this frame)
    W=W−1 (shrink window by one frame)
    m=m+1 (point to next frame)
    drop_rest=TRUE
If (nbits_to_send>A) then: (There is not enough space in the current in the current interval to transmit nbits_to_send)
  nbits_sent=min(P, A)
  Transmit nbits_sent bits beginning at buf_cur bits into EL frame m.

In the third sub-step, step S44 sets the a number of parameters as follows:
  A=A−nbits_sent (reduce remaining bit allocation for the current interval)
  buf_cur=buf_cur+nbits_sent (point to next portion of the EL frame to be transmitted)
  E=E+nbits_sent (add to the cumulative total the number of bits just transmitted)

After performing the above, step S44 will be completed and the method will loop back to Step S34. In step S34, the method will again determine if there is space left in the current interval (i). If there is enough space, the method will advance through steps as shown until EL data from the next frame will be transmitted in step S44. The method will stay in this loop until there is no space left in the current interval or until there are no EL frames left Further, in performing this loop, the method will determine if the window (W)≦0 in step S36. If this is true, then the method will advance to reset the window (W) and shrink the current EL frame size in step s38, as follows:

If (W≦0) then: If (B>0) then: W=min($W_{max}$, M−m) else W=0
  If (drop_rest is FALSE) then: buf_end=

$$\min\left[F - 1 - \left(\frac{B}{W}\right), -1\right]$$

Steps 36 and 38 address the situation where the window (W) of frames has expired and there is still additional EL data bits to be transmitted. Thus, step S38 resets the window (W) and shrinks the current EL frame again in order to account for these additional bits. Such a situation can arise when the parameter "B" cannot be evenly divided by "W". Further, this can occur when the data packets transmitted in step S44 have to contain an integral number of bytes as opposed to bits. Thus, a situation could arise where after the window (W) expires there are data bytes left over. Further, the formula to compute the window (W) in step S36 can be different than the formula used in step S30.

During implementation, some further modifications could also be made in order to enhance the operation of the embodiment in FIG. 4. For example, adjustments can be made if the network layer added overhead to the packets transmitted. This could be handled in step S44 by adjusting the calculations of parameters "A" and "E" by the amount of overhead added. Also, a network might require that the packets being transmitted contain an integral number of bytes (as opposed to bits). This also could be handled by modifying step S44 so that nbits_sent is always a multiple of eight bits.

Further, if the space left for transmitting an EL frame was less than a certain minimum (e.g. 3 bytes), the entire frame could be discarded. This could be handled by skipping the frame and subtracting the additional amount skipped from the parameter "B".

Figure 5:
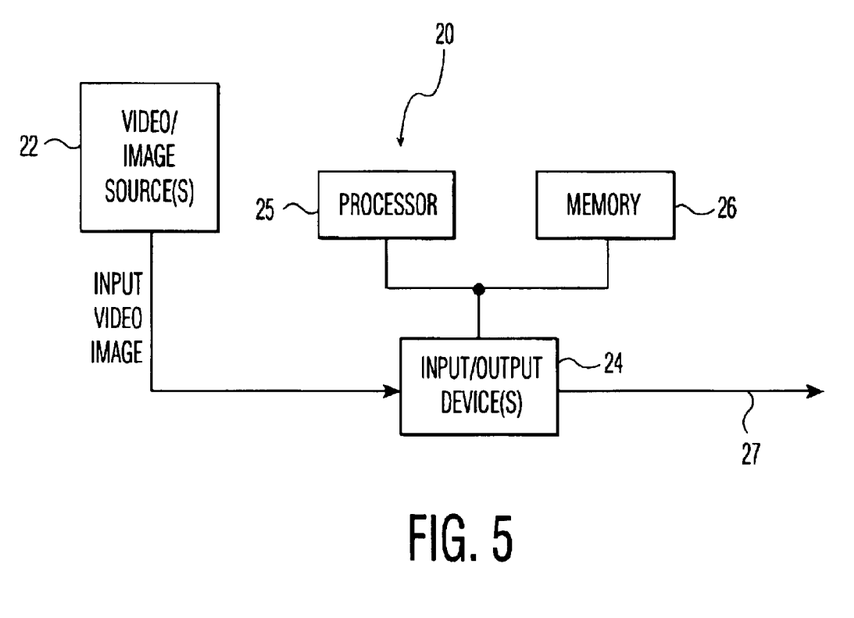
FIG. 5 is a block diagram of one embodiment of an apparatus according to the present invention.

A video/image processing apparatus 20 in which the present invention may be implemented is shown in FIG. 5. By way of examples, the system 20 may represent a television transmitter, a satellite transmitter, a cable head end, a network node, a network server, a wireless network node, a wireless base station a desktop, laptop or palmtop computer, a video/image storage device such as a video cassette recorder (VCR), a digital video recorder (DVR), etc., as well as portions or combinations of these and other devices.

The apparatus 20 includes one or more input/output devices 24, a processor 25 and a memory 26. Connected to the one or more input/output devices 24 are video/image source(s) 22, which may represent, e.g., a television receiver, a VCR or other video/image storage device. The source(s) 22 may alternatively represent one or more network connections for receiving video/images from a server or servers over, e.g., a global computer communications network such as the Internet, a wide area network, a metropolitan area network, a local area network, a terrestrial broadcast system, a cable network, a satellite network, a wireless network, or a telephone network, as well as portions or combinations of these and other types of networks.

As can be seen, a communication medium 27 is also connected to the one or more input/output devices 24. The communication medium 27 may represent, e.g., a global computer communications network such as the Internet, a wide area network, a metropolitan area network, a local area network, a terrestrial broadcast system, a cable network, a satellite network, a wireless network, or a telephone network, as well as portions or combinations of these and other types of networks.

Input video/images from the source(s) 22 is processed in accordance with one or more software programs stored in memory 26 and executed by processor 25 in order to generate output video data to be transmitted over the communication medium 27. These software programs would include encoders capable of encoding live video in a scalable manner. The live video could also be encoded and then stored in the memory 26.

Further, the video data may also be received pre-encoded so that it can be transmitted or stored in the memory 26, a tape or a disk to be transmitted at a later time. In that case, the processor 25 would not have to be used to encode the input video/images. This is because the pre-encoded video data could be read from the memory 26, tape, disk or received via the video/image source(s) 22.

The previously described method for streaming scalable video in the form of a computer readable code would also be stored in the memory 26 or read/downloaded from a memory medium such as a CD-ROM or floppy disk. Further, the processor 25 would also execute this code to stream scalable video data over the communication medium 27, according to the present invention.

In other embodiment of FIG. 5, hardware circuitry may be used in place of, or in combination with, software instructions to implement the invention.

It should be understood that the particular configuration of system 20 as shown in FIG. 5 is by way of example only. Those skilled in the art will recognize that the invention can be implemented using a wide variety of alternative system configurations.

While the present invention has been described above in terms of specific embodiments, it is to be understood that the invention is not intended to be confined or limited to the embodiments disclosed herein. For example, the invention is not limited to any specific compression scheme, frame type or probability distribution. On the contrary, the present invention is intended to cover various structures and modifications thereof included within the spirit and scope of the appended claims.

What is claimed is:

1. A method for streaming scalable video including base layer frames and enhancement layer frames, comprising the steps of:
   transmitting at least a portion of at least one of the base layer data frames for a given time interval;
   determining if a loss of bandwidth for the given time interval has occurred;
   selecting a number of enhancement layer frames to distribute the loss of bandwidth over;
   reducing a size of the selected number of enhancement layer frames to accommodate the loss of bandwidth transmit; and
   transmitting at least a portion of at least one of the enhancement layer frames for the given time interval, the at least one transmitted enhancement layer frame having been reduced in size.

2. The method according to claim 1, further comprising: transmitting non-enhancement layer data during the given time interval.

3. The method according to claim 1, wherein the reducing step is performed so that the loss of bandwidth is distributed evenly over the selected number of enhancement layer frames.

4. The method according to claim 1, further comprising the steps of:
   Determining if bandwidth remains in the given time interval; and
   if bandwidth remains in the given time interval, transmitting at least a portion of one or more enhancement layer frame from a second given time interval in the given time interval.

5. A method for streaming scalable video including base layer data and enhancement layer data, comprising the steps of:
   transmitting the base layer data for a given interval within a plurality of time intervals for a single video stream;
   determining if a loss of bandwidth has occurred during the given interval;
   selecting a predetermined number of frames to distribute the loss of bandwidth over;
   calculating a reduced amount of enhancement layer data to transmit in the predetermined number of frames;
   transmitting the reduced amount of enhancement layer data during the given interval;
   determining if the predetermined number of frames has expired;
   determining if any left-over enhancement layer data exists;
   selecting a second predetermined number of frames to distribute the left-over enhancement data over;
   calculating a second reduced amount of enhancement layer data to transmit in the second predetermined number of frames; and
   transmitting the second reduced amount of enhancement layer data in a second given interval.

6. The method according to claim 1, wherein enhancement layer data in the enhancement layer frames has a fine grain scalability structure.

7. A method for streaming scalable video including base layer frames and enhancement layer frames, comprising the steps of:
   transmitting at least a portion of at least one of the base layer frames for a given time interval;
   selecting a number of enhancement layer frames if a loss of bandwidth has occurred for the given time interval;
   distributing the loss of bandwidth over the selected number of enhancement layer frames by reducing a size of the selected number of enhancement layer frames; and
   transmitting at least a portion of at least one of the enhancement layer frames for the given time interval, the at least one transmitted enhancement layer frame having been reduced in size.

8. The method according to claim 7, wherein the distributing step is performed so that the loss of bandwidth is distributed evenly over the selected number of enhancement layer frames.

9. A memory medium including code for streaming scalable video including base layer frames and enhancement layer frames, the code comprising:
   first transmitting code for transmitting at least a portion of at least one of the base layer frames for a given time interval;
   determining code for determining if a loss of bandwidth has occurred for the given time interval;
   selecting code for selecting a number of enhancement layer frames to distribute the loss of bandwidth over;
   calculating code for calculating a reduced size of the selected number of enhancement layer frames; and
   second transmitting code for transmitting at least a portion of at least one of the enhancement layer frames for the given time interval, the at least one transmitted enhancement layer frame having been reduced in size.

10. An apparatus for streaming scalable video including base layer frames and enhancement layer frames, comprising:
    a memory which stores executable code; and
    a processor which executes the code stored in the memory so as to:
      transmit at least a portion of at least one of the base layer frames for a given time interval,
      determine if a loss of bandwidth has occurred for the given time interval,
      select a number of enhancement layer frames within the given time interval over which to distribute the loss of bandwidth,
      calculate a reduced size of the selected number of enhancement layer frames to accommodate the loss of bandwidth, and
      transmit at least a portion of at least one of the enhancement layer frames for the given time interval, the at least one transmitted enhancement layer frame having been reduced in size.

11. An apparatus for streaming scalable video including base layer frames and enhancement layer frames, comprising:

means for transmitting at least a portion of at least one of the base layer data frames for a given time interval;

means for determining if a loss of bandwidth has occurred for the given time interval;

means for selecting a number of enhancement layer frames to distribute the loss of bandwidth over;

means for reducing a size of the selected number of enhancement layer frames to accommodate the loss of bandwidth; and means for transmitting at least a portion of at least one of the enhancement layer frames for the given time interval, the at least one transmitted enhancement layer frame having been reduced in size.

12. The method according to claim 1, wherein the enhancement layer frames over which the loss of bandwidth is distributed comprise frames within the given time interval.

13. The method according to claim 1, wherein the reducing step comprises:

calculating an amount of enhancement layer data accommodating the loss of bandwidth during the given time interval.

14. The method according to claim 1, wherein the step of determining if a loss of bandwidth has occurred for the given time interval comprises:

determining a number of bits during the given time interval consumed by transmission of non-enhancement layer data.

15. The method according to claim 1, wherein the step of determining if a loss of bandwidth has occurred for the given time interval comprises:

determining a number of bits during the given time interval lost due to at least one of packet loss, noise, and bandwidth variation.

16. The method according to claim 1, wherein the reducing step comprises:

calculating a number of lost bandwidth bits to be allocated to each of the selected number of enhancement layer frames.

17. The method according to claim 1, wherein the step of transmitting at least a portion of at least one of the enhancement layer frames comprises:

transmitting a first reduced amount of enhancement layer data in first and last frames of the selected number of enhancement layer frames; and transmitting a second reduced amount of enhancement layer data different from the first amount in an enhancement layer frame between the first and last enhancement layer frames.

18. The method according to claim 1, wherein the determining step, selecting step, reducing step, and second transmitting step cumulatively result in dynamic adaptation of the scalable video stream to temporary reductions in available bandwidth during transmission of a portion of the scalable video stream.

19. The method according to claim 1, wherein the step of selecting the number of enhancement layer frames to distribute the loss of bandwidth over comprises:

selecting a predetermined number of remaining frames to be transmitted during the given time interval.

20. The method according to claim 1, further comprising:

following transmission of at least one of the enhancement layer frames that have been reduced in size, resuming transmission of enhancement layer frames that have not been reduced in size.

21. The method of claim 1, further comprising:

determining if the selected number of enhancement layer frames has expired;

determining if any left-over enhancement layer data exists;

selecting a second number of enhancement layer frames to distribute the left-over enhancement data over;

reducing a size of the selected second number of enhancement layer frames to accommodate the left-over enhancement data; and transmitting at least one of the second number of enhancement layer frames in a second given time interval.

22. The method of claim 1, wherein reducing the size of the selected number of enhancement layer frames comprises reducing the size of at least two enhancement layer frames by different amounts.

* * * * *